United States Patent [19]

Bleve et al.

[11] Patent Number: 5,482,543
[45] Date of Patent: Jan. 9, 1996

[54] MULTIPURPOSE, ECOLOGICAL WATER-PAINT

[75] Inventors: Donato L. Bleve; Francesco Defrancesco; Fernando Ciardo, all of Corsano, Italy

[73] Assignee: Laboratori Ecobios S.r.l., Corsano, Italy

[21] Appl. No.: 256,616

[22] PCT Filed: Dec. 7, 1992

[86] PCT No.: PCT/IT92/00159

§ 371 Date: Jul. 14, 1994

§ 102(e) Date: Jul. 14, 1994

[87] PCT Pub. No.: WO93/14165

PCT Pub. Date: Jul. 22, 1993

[30] Foreign Application Priority Data

Jan. 16, 1992 [IT] Italy .................... LE92A0001

[51] Int. Cl.[6] ................................. C09D 5/00
[52] U.S. Cl. ................. 106/14.05; 106/14.11; 106/14.21; 106/14.39; 106/14.41; 106/14.44; 106/14.45; 106/15.05; 106/18.11; 106/18.12; 106/18.36; 106/139; 106/146; 106/772; 106/773; 106/774; 106/776; 106/778; 106/780; 106/782; 106/788

[58] Field of Search ................... 106/139, 146, 106/14.05, 14.11, 14.21, 14.41, 14.39, 14.44, 15.05, 18.11, 18.12, 772, 773, 774, 776, 778, 780, 782, 788, 14.45, 18.36; 427/384

[56] References Cited

U.S. PATENT DOCUMENTS 1,781,019  11/1930  Larson ................................ 106/146
2,844,481  7/1958  Langworthy ....................... 106/146

Primary Examiner—Anthony Green
Attorney, Agent, or Firm—Herbert Dubno; Jonathan Myers

[57] ABSTRACT

A new and original water paint is disclosed, in liquid form, such as a milky emulsion, containing a low amount of water and comprising minerals, acetic acid solution, and other components. The new water paint has bactericidal, fireproof, transpiring, ecological, isolating and desalting properties and is suitable to coat manufactured building articles, wood, metals and plastic.

7 Claims, No Drawings

MULTIPURPOSE, ECOLOGICAL WATER-PAINT

FIELD OF THE INVENTION

This invention relates to a new water-paint in liquid form as a milky emulsion which has been derived from pasteurized whole milk or from powdered milk diluted with water. The invention further relates to a new water-paint with a low water content and which contains minerals, acetic acid and other components. The new water-paint has bactericidal, fireproof, transpiring, ecological, isolating and desalting properties, and is suitable for use in the manufacture of building materials, wood, metals and plastics.

BACKGROUND OF THE INVENTION

A typical varnish is usually a solution or a suspension having a variable consistency, with or without coloring pigments. When the varnish is applied to an object, upon drying, a tough, resistant film with protective properties forms. The varnish consists of a liquid vehicle in which coloring components (in the case of a colored paint) and various additives are suspended. At one time the liquid vehicle was composed of oils, but nowadays it is composed of synthetic resins obtained through polymerization or polycondensation. Solvents or thinners (alcohols, esters, etc.) are the binding elements. Special characteristics may be given to the paint by including additives therein, such as drying agents, suspending agents and plasticizers. The plasticizers are particularly important because as an integral part of the paint film, they improve elasticity and flexibility.

OBJECTS OF THE INVENTION

It is an object of the invention to provide a water-paint for the protection of a horizontal or vertical surface from mildew, hydroscopic salts, potassium nitrate efflorescence, and other salts as well serving as a dehumidifying agent.

It is a further object of the invention to provide a water-paint in order to coat a wall so that the wall will be impervious to air and water.

It is a further object of the invention to provide a water paint as an additive for mortars in a proportion of 20 to 30% for stucco and 50% for plaster.

SUMMARY OF THE INVENTION

We have discovered a new and original composition whose advantages are not easily found in common coatings that are available in the art. The fundamental principle in the present invention is that the milk (whole pasteurized milk or powdered milk) is allowed to amalgamate in a solution with a low amount of water and which also contains the following substances:

(a) minerals, which include calcium sulfate which may be in the form of powdered stucco; as well as lithopone or a mixture of barium sulfate and zinc sulfide; silicon oxide; calcium oxide; calcium carbonate; calcium hydroxide; cement; talc; and all the alkali or alkaline earth minerals;

(b) an aqueous solution of acetic acid obtained from wine, beer, cider and other slightly alcoholic liquids through distillation and synthesis processes wherein the acetic acid content is 6 to 15% by weight;

(c) wood, especially wood shavings;

(d) polyacrylic, polyvinyl or polyurethane resins;

(e) polysaccharides having either a mechanical function (cellulose, chitin) or a thickening function (wheat flour, oatmeal, corn meal, bone meal, fish meal, beet sugar, cane sugar, fructose, saccharose, and dextrose);

(f) drying oils such as hempseed oil, linseed oil, and tung oil, mainly composed of glycerides of unsaturated fatty acids and charged with lead oxides, zinc oxides and manganese oxides or with cobalt, lead or manganese resinates obtained by fusion with colophony;

(g) essential oils to scent the paint and which have been extracted from fruits, flowers, leaves and wood using organic solvents;

(h) repellents such as silicon oils, an organic mixture obtained by polycondensation of alkyl-silanol trioxide $RSi(OH)_3$ and dialkylsilanol dihydroxide $R_2Si(OH)_2$;

(i) pigments such as oxides, dioxides and soil; and (j) bleaching agents with both oxidizing and reducing properties.

An emulsion containing all of the above is obtained by centrifuging a mixture with the following basic components: milk, vinegar, calcium hydroxide (slaked lime), lithopone and powdered stucco.

The new water-paint with the properties mentioned in the Objects of the Invention is achieved because application of the new paint to walls causes a strong exothermic reaction of acetic acid, lactic acid (contained in milk), on the calcium hydroxide which produces water vapor. At the same time calcium sulfate, which needs to be hydrated, absorbs the water in a humid wall or of ossidrilic bases of the salts in the walls. The desalting action is carried out by the lithopone, which through oxide reduction replaces the hydroscopic salts. Furthermore removal of the water prevents the melting of corrosive hydroscopic salts and the formation of efflorescence both where there is water-paint and nearby it.

The heat generated by the exothermic reaction causes the drying of mildew thus restoring the walls below. Another important role in the dehumidification process is played by calcium sulfate, which, having been emulsified, has not been stabilized with two molecules of water. After the application of the water-paint, this process produces a compacting effect of the paint on the wall.

Ways to Carry Out the Invention

The new water-paint is obtained from the following partial mixture of ingredients which has been previously thoroughly amalgamated:

(a) 13% powdered stucco with 6% pasteurized whole milk and 2.5% vinegar in a solution with a low amount of water;

(b) 13% lithopone and 3% pasteurized whole milk and 2.5% vinegar in a solution with a low amount of water;

(c) 2% white cement in powder and water;

(d) 2% titanium powder and water; and (e) a solution of 47% calcium hydroxide with a low amount of water which is successively amalgamated with the following ingredients: 5% pasteurized whole milk, water, and again 2% pasteurized whole milk and 2.5% vinegar.

Then solutions (a), (b), (c), (d) and (e) are successively mixed and then 1% pasteurized whole milk and 1% vinegar are added. Solution (e) can be separately used as a semitransparent primer coat to protect surfaces from mildew, saltpeter, and/or moisture. The combination of solutions (b) lithopone (doubled), (c) cement, (d) titanium, and (e) calcium hydroxide, produces a water-paint which can be used as a primer coat and has optimal transpiration, covering and pigmentation properties to paint manufactured building articles.

The quantities of the said water-paint components can be then summarized as follows: milk (10 to 17%), vinegar (6 to 8%), calcium hydroxide (46 to 72%), calcium sulfate (2 to 16%), and lithopone (9 to 15%).

The following components can be added to the water-paint which is then centrifuged to form a dispersion.

(a) 0.15 in volume percentage of essential oils to scent the paint;

(b) pigments: 0.5 to 1% by volume per cent oxides; 3 to 6% by weight dioxides, and/or soil;

(c) 5 to 15% in weight percentage white cement and/or talc and/or silicon to give better mechanical resistance; and (d) 4 to 6% in weight percentage of polysaccharides to improve mechanical resistance and 1 to 3% in weight percentage additional polysaccharides.

In order to obtain stuccos, mortars, and bonding agents suitable for filling, finishing, restoring and coating walls, wood, metals and plastic materials, the following components should also be dispersed by centrifugation to form a basic emulsion: 1 to 3% by weight polystyrene products, 2 to 4% by weight polyacrylic products, 2 to 6% drying oils, 1 to 3% bleaching agents, and 2 to 5% wood shavings.

EXAMPLE

A practical formulation of the water-paint according to the invention comprises a mixture of milk ( 10% ), vinegar ( 6% ), and linseed oil (1%) in which calcium hydroxide (72%), calcium sulfate (2%), and lithopone (9%) are centrifuged to form a dispersion to obtain the water-paint.

We claim:

1. A biological, multi-purpose, water-paint in the form of a milky emulsion with bactericidal, fire-proof, transpiring, isolating, antioxidant, and desalting properties suitable for protecting a surface of manufactured building articles, wood, metals or plastics, which comprises:

(a) 10 to 17% pasteurized whole milk or powdered milk;

(b) 6 to 8% vinegar containing 6 to 15% acetic acid;

(c) 46 to 72% calcium hydroxide;

(d) 2 to 16% calcium sulfate or powdered stucco; and (e) 9 to 15% lithopone.

2. The biological, multi-purpose water-paint defined in claim 1 which further comprises 0.15% by volume essential oils extracted from fruit, flowers, leaves and wood to scent the paint; 5 to 15% by weight of white cement, talc or silicon; 0.5 to 1% by volume of oxides, 3 to 6% by weight of dioxides and soil as pigments; 4 to 6% by weight of polysaccharides capable of increase mechanical resistance and 1 to 3% by weight of polysaccharides capable of thickening the paint.

3. A method of preparing a biological, multi-purpose, water-paint in the form of a milky emulsion with bactericidal, fire-proof, transpiring, isolating, antioxidant, and desalting properties suitable for manufactured building articles, wood, metals or plastics, which comprises:

(a) 10 to 17% pasteurized whole milk or powdered milk;

(b) 6 to 8% vinegar containing 6 to 15% acetic acid;

(c) 46 to 72% calcium hydroxide;

(d) 2 to 16% calcium sulfate or powdered stucco; and (e) 9 to 15% lithepone, which comprises the following steps:

(A) mixing 10 to 17% milk, 6 to 8% vinegar comprising 6 to 15% acetic acid, 46 to 70% calcium hydroxide, 2 to 16% calcium sulfate or powdered stucco, and 9 to 15% lithepone to form a mixture; and (B) centrifuging the mixture prepared according to step (B) to form a milky emulsion.

4. A method of protecting a surface of a manufactured building article, rood, metal or plastic which comprises the step of applying to said surface an amount of the biological, multi-purpose rarer paint defined in claim 1 effective to protect said surface from corrosion due to hydroscopic salts mildew or dehumidification.

5. A biological, multi-purpose, water-paint in the form of a milky emulsion with bactericidal, fire-proof, transpiring, isolating, antioxidant, and desalting properties suitable for adding to stucco or plaster, which comprises:

(a) 10 to 17% pasteurized whole milk or powdered milk;

(b) 6 to 8% vinegar containing 6 to 15% acetic acid;

(c) 46 to 72% calcium hydroxide;

(d) 2 to 16% calcium sulfate or powdered stucco;

(e) 9 to 15% lithepone;

(f) 1 to 3% of polyurethane;

(g) 2 to 4% acrylic polymer;

(h) 2 to 6% drying oil;

(i) 1 to 3% bleaching agent; and (j) 2 to 5% wood shavings.

6. A method of preparing a biological, multi-purpose, water-paint in the form of a milky emulsion with bactericidal, fire-proof, transpiring, isolating, antioxidant, and desalting properties, suitable for adding to stucco or plaster, which comprises:

(a) 10 to 17% pasteurized whole milk or powdered milk;

(b) 6 to 8% vinegar containing 6 to 15% acetic acid;

(c) 46 to 72% calcium hydroxide;

(d) 2 to 16% calcium sulfate or powdered stucco;

(e) 9 to 15% lithepone;

(f) 1 to 3% of polyurethane;

(g) 2 to 4% acrylic polymer;

(h) 2 to 6% drying oil;

(i) 1 to 3% bleaching agent; and (j) 2 to 5% wood shavings, which comprises the following steps:

(A) mixing 10 to 17% milk, 6 to 8% vinegar comprising 6 to 15% acetic acid, 46 to 70% calcium hydroxide, 2 to 16% calcium sulfate or powdered stucco, 9 to 15% lithepone, 1 to 3% polyurethane, 2 to 4% acrylic polymer, 2 to 6% drying oil, 1 to 3% bleaching agent, and 2 to 5% wood shavings to form a mixture; and (B) centrifuging the mixture prepared according to step (B) to form a milky emulsion.

7. A method of protecting stucco or plaster which comprises the step of adding to a mortar formed for the preparation of stucco or plaster, the water paint composition defined in claim 5 in a proportion of 20 to 30% for stucco and 50% for plaster.

* * * * *